United States Patent
Wolf et al.

(10) Patent No.: US 11,315,124 B2
(45) Date of Patent: Apr. 26, 2022

(54) ANALYZING TEMPORAL CLASSES IN USER FEEDBACK

(71) Applicant: INTERNATIONAL BUSINESS MACHINES CORPORATION, Armonk, NY (US)

(72) Inventors: Christine T. Wolf, San Jose, CA (US); Raphael I. Arar, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 16/417,551

(22) Filed: May 20, 2019

(65) Prior Publication Data

US 2020/0372516 A1    Nov. 26, 2020

(51) Int. Cl.
| | |
|---|---|
| *G06Q 30/00* | (2012.01) |
| *G06F 8/71* | (2018.01) |
| *G06F 40/20* | (2020.01) |
| *G06F 40/169* | (2020.01) |

(52) U.S. Cl.
CPC ........... *G06Q 30/016* (2013.01); *G06F 8/71* (2013.01); *G06F 40/169* (2020.01); *G06F 40/20* (2020.01)

(58) Field of Classification Search
CPC ..... G06Q 30/016; G06F 40/20; G06F 40/169; G06F 8/71; G06F 40/268; G06F 40/30; G06F 40/211
See application file for complete search history.

(56) References Cited

U.S. PATENT DOCUMENTS

| | | | |
|---|---|---|---|
| 8,713,438 B1 | 4/2014 | Broniek et al. | |
| 8,996,355 B2 | 3/2015 | Orsini et al. | |
| 9,396,179 B2 | 7/2016 | Stavrianou et al. | |
| 2009/0157401 A1 | 6/2009 | Bennett | |
| 2013/0132931 A1 | 5/2013 | Bruns et al. | |
| 2013/0185175 A1 | 7/2013 | Roozen et al. | |
| 2014/0337012 A1 | 11/2014 | Bastide et al. | |
| 2015/0347367 A1 | 12/2015 | Berke et al. | |
| 2016/0078349 A1* | 3/2016 | Byron | G06F 16/3329 706/12 |
| 2017/0109758 A1 | 4/2017 | Boss et al. | |
| 2018/0183930 A1* | 6/2018 | Raanani | G06F 16/3344 |

OTHER PUBLICATIONS

Mell et al., "The NIST Definition of Cloud Computing," National Institute of Standards and Technology, Sep. 2011, p. 1-3, Special Publication 800-145.

\* cited by examiner

*Primary Examiner* — Pei Yong Weng
(74) *Attorney, Agent, or Firm* — Rakesh Roy

(57) ABSTRACT

A method, computer system, and a computer program product for feedback analysis is provided. The present invention may include, in response to identifying, using a natural language processing (NLP) component, a verb-related tag in a feedback data associated with a current version of a product or service, classifying the feedback data into a temporal class based on the identified verb-related tag. The present invention may also include, analyzing, using the NLP component, the classified feedback data within the temporal class. The present invention may further include, determining, based on the analyzed feedback data, a user perception associated with the current version of the product or service relative to the temporal class of the analyzed feedback data.

14 Claims, 5 Drawing Sheets

ANALYZING TEMPORAL CLASSES IN USER FEEDBACK

BACKGROUND

The present invention relates generally to the field of computing, and more particularly to the continuous delivery of products and services.

The continuous delivery of products and services, such as those that follow an Agile method, may implement a "closed loop" user (e.g., customer) feedback model where ongoing feedback from users may be gathered to gauge user reactions, determine potential new features, and calibrate offerings to user needs over time.

SUMMARY

Embodiments of the present invention disclose a method, computer system, and a computer program product for feedback analysis. The present invention may include, in response to identifying, using a natural language processing (NLP) component, a verb-related tag in a feedback data associated with a current version of a product or service, classifying the feedback data into a temporal class based on the identified verb-related tag. The present invention may also include, analyzing, using the NLP component, the classified feedback data within the temporal class. The present invention may further include, determining, based on the analyzed feedback data, a user perception associated with the current version of the product or service relative to the temporal class of the analyzed feedback data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
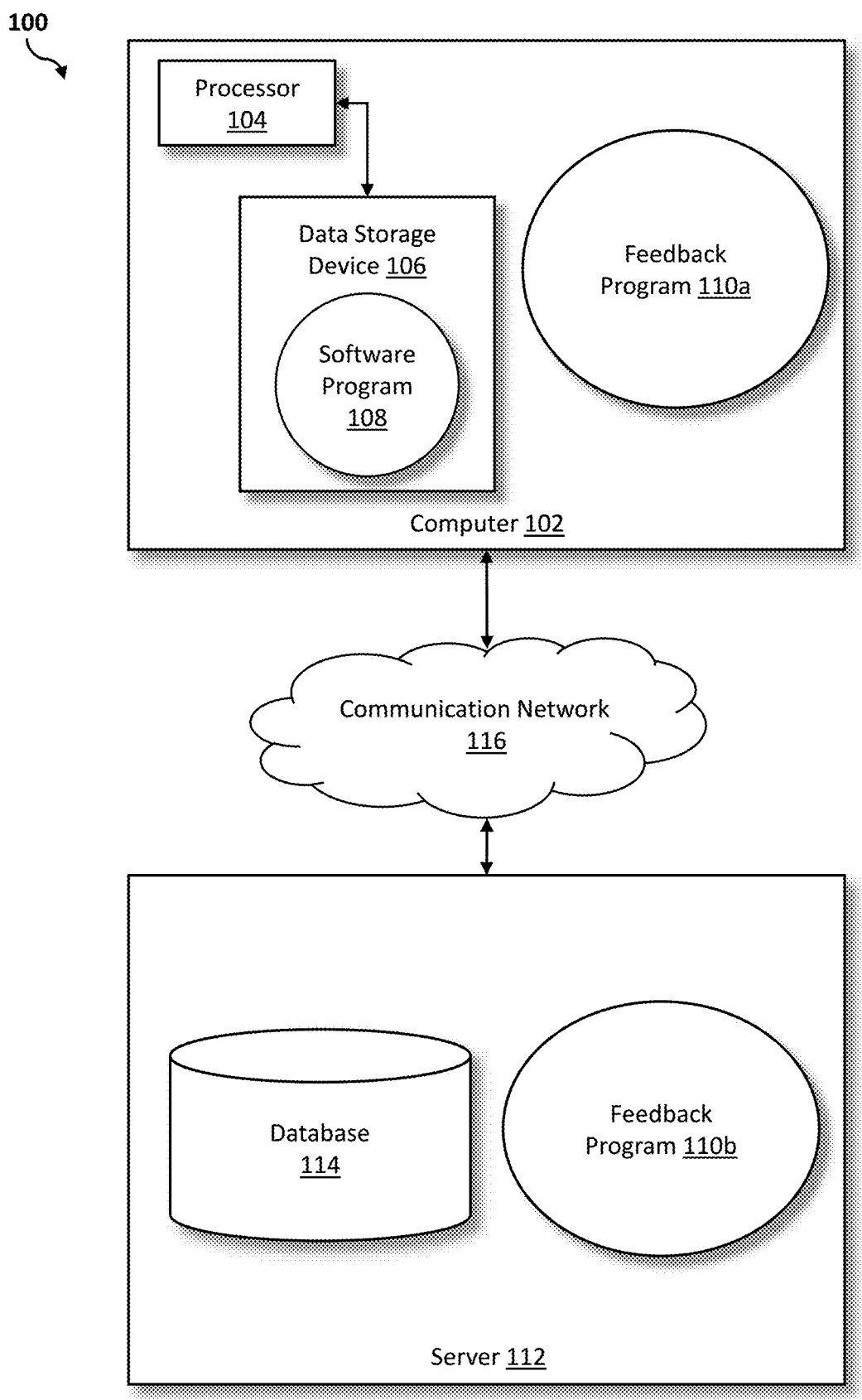
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for analyzing temporal classes in user feedback. As such, the present embodiment has the capacity to improve the technical field of continuous delivery of products and services by analyzing user feedback within each temporal class to understand user perceptions of previous, current, and future versions of a product or service. More specifically, a feedback program may gather user feedback relating to a product or service offered at a point in time. Then, the feedback program may implement natural language processing (NLP) to identify verb-related tags in the user feedback. Next, the feedback program may classify the feedback strings of the user feedback into three temporal classes representing past, present, and future. The feedback program may then analyze the user feedback within each temporal class to understand user perceptions of previous, current, and future versions of a product or service. Further, the feedback program may analyze successive sets of user feedback to determine changes in user perspectives over time.

As described previously, the continuous delivery of products and services, such as those that follow an Agile method, may implement a "closed loop" user (e.g., customer) feedback model where ongoing feedback from users may be gathered to gauge user reactions, determine potential new features, and calibrate offerings to user needs over time.

Gathering user feedback may be time consuming and expensive, and it may be especially challenging in continuous delivery environments where the products/services may rapidly change as new features are released on an ongoing basis.

With each version release and change in the product/service, the perspective of the user with respect to the product/service may also change. For example, the user feedback may relate to: new feature releases (e.g., feedback on current version of the tool in production), alternate versions of the product/service (e.g., feedback on prior release versions of the tool), and/or future release versions requested by users (e.g., feedback on the tool as it may be in the future).

Therefore, while existing NLP techniques may enable real-time analysis of user-generated content/feedback, it may be advantageous to, among other things, provide a way to enable the content of user feedback to be analyzed temporally and monitored for changes over time. It may also be advantageous to save time and money by semi-automating the user feedback process and enable new forms of feedback monitoring that may offer new insights in the continuous delivery lifecycle. It may further be advantageous to provide longitudinal insights from a single data source; that is, insights may be gained into the perception of the user for multiple versions of the tool, even though the user feedback may only be gathered at one point in time (e.g., at version X).

According to one embodiment, the feedback program may define a product/service for which to gather user feedback at version X, where X may provide the version of the product/service in production at a point in time when the user feedback is gathered.

According to another embodiment, the feedback program may gather user feedback from various channels or sources and may convert any user feedback including audio/verbal data to text data. Then, the feedback program may assign the user feedback string to version X.

According to at least one embodiment, the feedback program may code the user feedback string using NLP techniques such as parts-of-speech tagging (PoS tagging) and may then isolate all verb-related tags from the user feedback string. The verb-related tags may include: VB (verb, base form), VBD (verb, past tense), VBG (verb, gerund), VBN (verb, past participle), VBP (verb, non-$3^{rd}$ person singular present), VBZ (verb, $3^{rd}$ person singular present), and VBC (verb, future tense, conditional).

According to another embodiment, the feedback program may classify the user feedback string into temporal classes based on the isolated verb-related tags. If the identified verb is present tense, the feedback program may assign the string to class N, where N may include a class label denoting the current version of the product/service. If the identified verb is past tense, the feedback program may assign the string to class N−1, where N−1 may include the class label denoting any prior version of the product/service. If the identified verb is future tense or preceded by "will," the feedback program may assign the string to class N+1, where N+1 may include the class label denoting any future version of the product/service.

According to another embodiment, the feedback program may implement one or more NLP techniques to analyze each temporal class (N, N−1, N+1) for the product/service at version X. For example, the feedback program may perform sentiment analysis to measure the emotional responses of the users to specific versions of the product/service in each temporal class. In addition, the feedback program may perform topic modeling to draw out and identify the predominant issues raised in each temporal class. In one embodiment, the feedback program may perform a comparative analysis to identify differences across temporal classes for version X of the product/service. Additionally, the feedback program may be implemented for different versions of the product/service (e.g., version Y) and compared to temporal classes from alternate versions (e.g., version X) of the product/service.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a feedback program 110a. The networked computer environment 100 may also include a server or server computer 112 that is enabled to run a feedback program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the feedback program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the feedback program 110a, 110b (respectively) to enable the contents of user (e.g., customer) feedback to be analyzed temporally and monitored for changes over time. The feedback analysis method is explained in more detail below with respect to FIG. 2.

Figure 2:
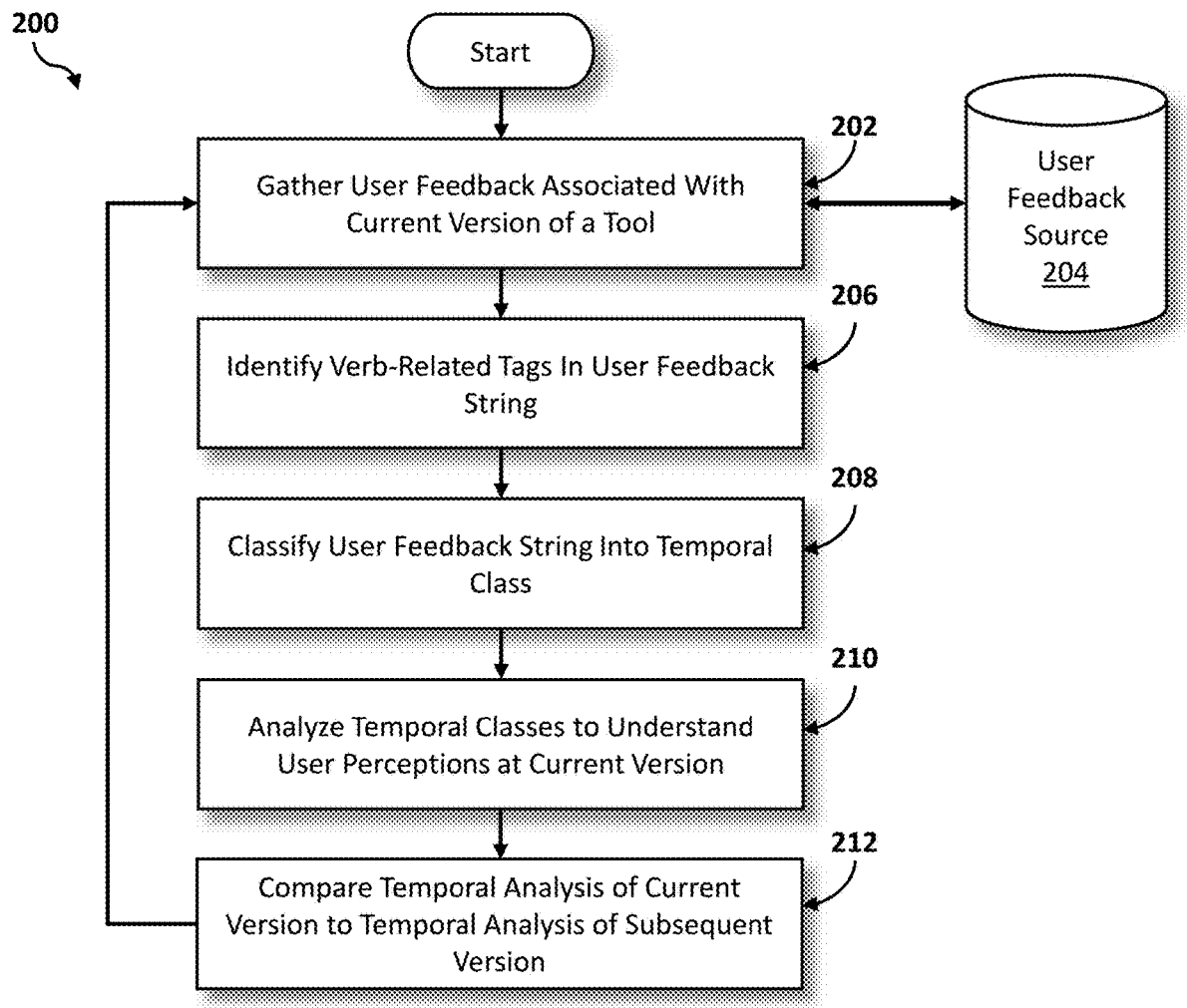
FIG. 2 is an operational flowchart illustrating a process for feedback analysis according to at least one embodiment.

Referring now to FIG. 2, an operational flowchart illustrating the exemplary feedback analysis process 200 used by the feedback program 110a and 110b according to at least one embodiment is depicted.

At 202, user feedback associated with a current version of a tool is gathered. A feedback program 110a, 110b may assign a unique version name or number to identify a state of a tool (e.g., product/service) offered to a user (e.g., customer) at a point in time. In one embodiment, the feedback program 110a, 110b may identify the tool as version X, where X may define the version of the tool in production at the point in time when the user feedback is gathered.

After the tool is deployed to users, the feedback program 110a, 110b may implement a retrieval component to access (e.g., via communication network 116) a user feedback source 204 and gather user feedback associated with the current version of the deployed tool. The user feedback source (e.g., data source) 204 may include various channels such as, social network platforms, "Customer Reviews" section of a webstore, customer service E-mails, or any suitable method by which the user may provide feedback. In one embodiment, if the user feedback is in the form of audio/video data (e.g., video review of tool), the feedback program 110a, 110b may convert the audio data into text data.

Once the user feedback is gathered from the user feedback source 204 by the retrieval component, the feedback program 110a, 110b may assign a feedback data (e.g., text data) of the user feedback (e.g., user feedback string) to the associated version (e.g., version X) of the tool. As such, the feedback program 110a, 110b may link the user feedback associated with version X of the tool for further processing and analysis.

For example, the feedback program 110a, 110b defines an application deployed to customers as version 4 (app., v. 4). After the release of app., v. 4, the feedback program 110a, 110b gathers three customer feedbacks from the user feedback source 204. In the first customer feedback, the feedback program 110a, 110b identifies the string: "The new note-taking features are great". In the second customer feedback, the feedback program 110a, 110b identifies the string: "I liked it better before when the app had different notification tones". In the third customer feedback, the feedback program 110a, 110b identifies the string: "The tool will be useful after some more enhancements to the collaboration functions". Then, the feedback program 110a, 110b assigns each of the customer feedback strings to app., v. 4.

Then at 206, a verb-related tag in the user feedback string is identified. The feedback program 110a, 110b may implement an NLP component to label each word in the user feedback string with an associated parts-of-speech tag (e.g., PoS tagging). In one embodiment, the NLP component may first breakdown or tokenize each word in the user feedback string. Then, PoS tagging may be used to label each word (e.g., token) as a noun (N), verb (V), adjective (ADJ), adverb (ADV), preposition (P), conjunction (CON), pronoun (PRO), or interjection (INT) based on, for example, whether the word is capitalized, whether the word is the first/last word of the sentence, and the surrounding words. In one embodiment, the PoS tagging may analyze the relationship of each of the words to determine the appropriate label for each word. For example, the PoS tagging may determine that a word located before a verb that modifies the verb may be considered an adverb. In another embodiment, the PoS tagging may further specify the verb tag as: VB (verb, base form), VBD (verb, past tense), VBG (verb, gerund), VBN (verb, past participle), VBP (verb, non-$3^{rd}$ person singular present), VBZ (verb, $3^{rd}$ person singular present), or VBC (verb, future tense, conditional). Thereafter, the feedback program 110a, 110b may isolate all verb-related tags in the user feedback string.

Continuing with the previous example, in the first customer feedback, the feedback program 110a, 110b implements the NLP component and identifies/isolates "are" as a verb-present tense (VBP) in the string: "The new note-taking features [are] great".

In the second customer feedback, the feedback program 110a, 110b implements the NLP component and identifies/isolates "liked" and "had" as verb-past tense (VBN) in the string: "I [liked] it better before when the app [had] different notification tones".

In the third customer feedback, the feedback program 110a, 110b implements the NLP component and identifies/isolates the verb "be" preceded by "will" as verb-future tense, conditional (VBC) in the string: "The tool [will be] useful after some more enhancements to the collaboration functions".

Then at 208, the user feedback string is classified into a temporal class. In one embodiment, the feedback program 110a, 110b may implement a classification component to classify the user feedback string into one of three temporal classes: present tense, past tense, and future tense based on the verb-related tag identified in the user feedback string. If the identified verb (e.g., verb-related tag) is present tense, the classification component may assign the user feedback string to class N, where the N class label may denote a current version of the tool. If the identified verb is past tense, the classification component may assign the user feedback string to class N−1, where the N−1 class label may denote any prior version of the tool. If the identified verb is conditional (e.g., preceded by "will"), the classification component may assign the user feedback string to class N+1, where the N+1 class label may denote any future version of the tool.

Thus, based on the verb-related tags identified in the user feedback, the classification component of the feedback program 110a, 110b may parse or organize the user feedback into one of three temporal classes: present tense, past tense, and future tense, which may indicate whether the user feedback relates to the current, prior, or future version of the tool.

Continuing with the previous example, the feedback program 110a, 110b implements the classification component to classify the three customer feedback strings into one of three temporal classes: present tense (N), past tense (N−1), and future tense (N+1).

The classification component identifies the verb-present tense (VBP) in the first customer feedback string: "The new note-taking features [are] great" and assigns the N class label to the first customer feedback. The classification component identifies the verb-past tense (VBN) in the second customer feedback string: "I [liked] it better before when the app [had] different notification tones" and assigns the N−1 class label to the second customer feedback. The classification component identifies the verb-future tense, conditional (VBC) in the third customer feedback string: "The tool [will be] useful after some more enhancements to the collaboration functions" and assigns the N+1 class label to the third customer feedback.

Then at 210, the temporal classes are analyzed to understand the user perceptions at the current version. After parsing the user feedback into one of the three temporal classes, the feedback program 110a, 110b may implement the NLP component to determine the perceptions of the user as relating to the current, previous or prior, and future versions of the tool. In another embodiment, the NLP component may determine the perceptions of the user associated with the current version of the tool relative to the prior and/or future versions of the tool. In one embodiment, the NLP component may utilize various NLP techniques, such as sentiment analysis and/or topic modeling, to analyze each temporal class (e.g., N, N−1, N+1) of the user feedback associated with the tool at version X.

Using sentiment analysis, the NLP component may measure the emotional response of the user (e.g., user sentiment) to version X of the tool in each temporal class. In one embodiment, the sentiment analysis may measure that the user may like version X of the tool (e.g., user feedback labeled as current temporal class N). In one embodiment, the sentiment analysis may measure that the user may have preferred a prior version of the tool relative to version X of the tool (e.g., user feedback labeled as prior temporal class N−1). In one embodiment, the sentiment analysis may measure that the user may like a future version of the tool, relative to version X of the tool (e.g., user feedback labeled as future temporal class N+1).

Using topic modeling, the NLP component may draw out and identify the predominant issues raised by the user to version X of the tool in each temporal class. In one embodiment, the topic modeling may identify that the user likes a new feature A included in version X of the tool (e.g., user feedback labeled as current temporal class N). In one embodiment, the topic modeling may identify that the user liked an old feature B, now removed in version X of the tool (e.g., user feedback labeled as prior temporal class N−1). In one embodiment, the topic modeling may identify that the user is looking forward to a potential future feature C, not yet included in version X of the tool (e.g., user feedback labeled as future temporal class N+1).

Thereafter, based on the measurements of the NLP component, the feedback program 110a, 110b may perform comparative analysis to identify differences across the temporal classes for version X of the tool. Accordingly, the feedback program 110a, 110b may provide longitudinal insights from a single data source, for example, the user feedback gathered at one point in time (e.g., a version X). From the single data source, the feedback program 110a, 110b may identify insights into the perceptions of the user associated with multiple versions of the tool (e.g., current, prior, future versions). In one embodiment, the comparative analysis may provide insights associated with new features and changes in version X of the tool and may provide longitudinal insights to help plan future enhancements (e.g., features) in subsequent versions of the tool. In one embodiment, the feedback program 110a, 110b may generate a report including the insights determined from the user feedback.

Continuing with the previous example, after classifying the first customer feedback with current temporal class N, the second customer feedback with prior temporal class N−1, and the third customer feedback with future temporal class N+1, the feedback program 110a, 110b implements the NLP component to perform sentiment analysis and topic modeling using the three customer feedbacks associated with app., v. 4.

After the analysis of the first customer feedback ("The new note-taking features are great") using the NLP component, the feedback program 110a, 110b determines that the customer likes "note-taking features" in version 4 of the app. After the analysis of the second customer feedback ("I liked it better before when the app had different notification tones") using the NLP component, the feedback program 110a, 110b determines that the customer liked the "different notification tones" feature in a prior version of the app. Further, after the analysis of the third customer feedback ("The tool will be useful after some more enhancements to the collaboration functions") using the NLP component, the feedback program 110a, 110b determines that the customer would like, in future versions of the app, features that enhance "the collaboration functions."

Then at 212, the temporal analysis of the current version is compared with a temporal analysis of a subsequent version. According to one embodiment, the feedback program 110a, 110b may be implemented with future versions of the tool (e.g., tool at version Y) in a manner similar to the process previously described at 202 to 210. Thereafter, the feedback program 110a, 110b may compare the temporal analysis of the tool at version X (e.g., current temporal analysis) against a subsequent temporal analysis of the tool at a future version Y (e.g., subsequent temporal analysis). The comparative temporal analysis of the tool at versions X and Y may provide continuous insights into the performance of the tool during the tool lifecycle as new features are released.

Continuing with the previous example, the feedback program 110a, 110b is implemented with a new version 5 of the app. After the analysis of a new customer feedback to version 5 of the app ("New collaboration features are great start but real-time collaboration would be really helpful") using the NLP component, the feedback program 110a, 110b determines that the customer likes the "collaboration features" in the new version 5 of the app, but would want the app to go even further and include "real-time collaboration" in future versions. Further, the comparative temporal analysis of the app at versions 4 and 5 indicates that the performance of the app is moving in the right direction and catering to the feedback of the customers.

According to one embodiment, if the user feedback string is noisy and includes linguistic errors (e.g., slang/shorthand, typos, text speak), the feedback program 110a, 110b may implement a PoS tagger augmentation method that is trained to process social media text. The PoS tagger augmentation may increase the accuracy of PoS tagging in instances of sparse, noisy, and error-prone data. In another embodiment, the feedback program 110a, 110b may enable an analyst or admin-user to conduct error analysis manually based on metrics set by the analyst. In one embodiment, the feedback program 110a, 110b may enable the analyst to set a threshold of 50% confidence. Then, the feedback program 110a, 110b may return all user feedback strings for which the classifier (e.g., PoS tagger) is less than 50% confident so that the analyst may manually re-label the user feedback strings as appropriate.

According to another embodiment, if the user feedback string includes icons, such as emoticons or emojis, the icons may be subsequently analyzed using emoticon sentiment analytic techniques after the user feedback strings have been classified into temporal classes. For example, in the user feedback string: "The app was great, what happened [inserted sad face emoticon]," the feedback program 110a, 110b may classify the feedback string into the past tense class (based on "was" and "happened" which are both past tense verbs). Then, subsequent analysis may model the sentiment of the "[inserted sad face emoticon]," for example using emoticon sentiment analytic techniques. However, if the entire user feedback string includes icons, (e.g., "[three inserted sad face emoticons]"), the feedback program 110a, 110b may return a low classifier confidence score and the analyst may manually re-label the user feedback string as appropriate.

The functionality of a computer may be improved by the feedback program 110a, 110b because the feedback program 110a, 110b may enable analyzing a user feedback to a tool (e.g., product/service implemented using continuous delivery model) gathered at a point in time and determining, from that single data point, the user perceptions of previous, current, and future versions of the tool. The feedback program 110a, 110b may enable gathering continuous feedback from users, automatically determining potential improvements/new features requested by the users, and calibrating offerings in new version of the tool. The feedback program 110a, 110b may provide feedback monitoring that enables the content of user feedback to be analyzed temporally and monitored for changes over time. The feedback program 110a, 110b may enable semi-automating the user feedback process and enable new forms of feedback monitoring that may offer new insights in the continuous delivery lifecycle of a tool.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
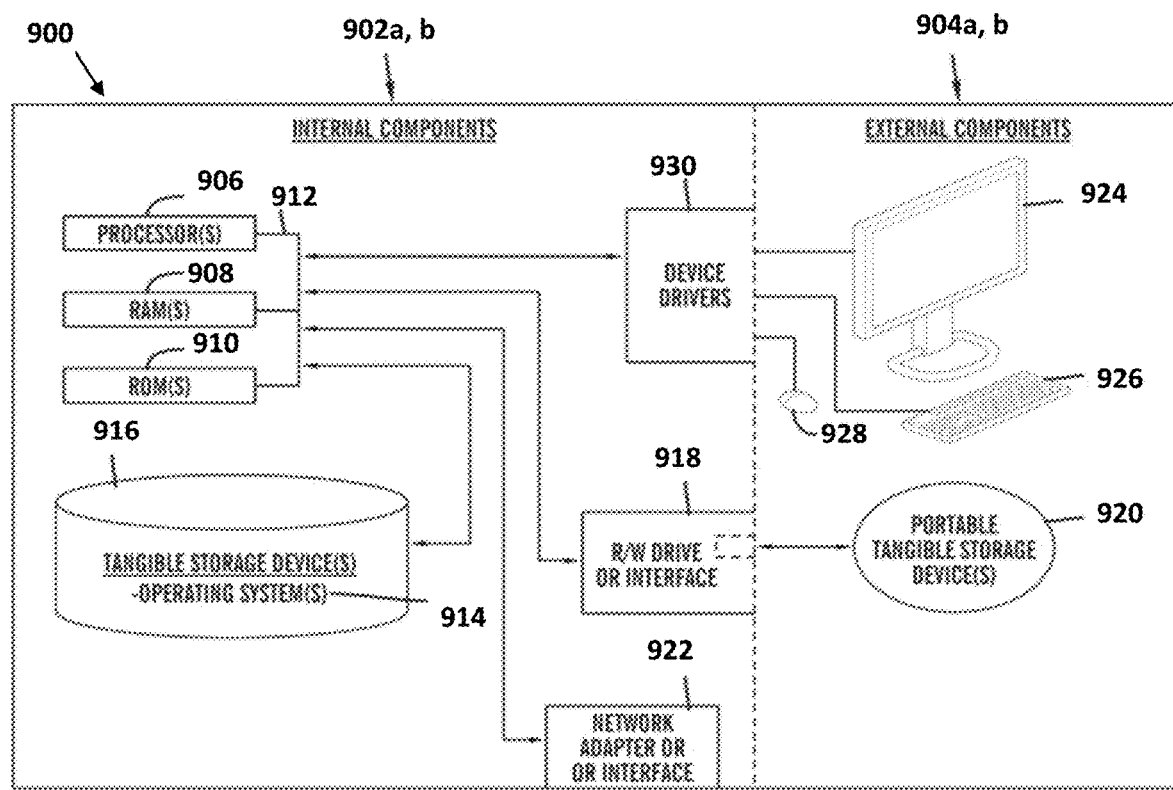
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the feedback program 110a in client computer 102, and the feedback program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the feedback program 110a and 110b can be stored on one or more of the respective portable computer-readable tangible storage devices 920, read via the respective R/W drive or interface 918 and loaded into the respective hard drive (e.g., computer-readable tangible storage devices) 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the feedback program 110a in client computer 102 and the feedback program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the feedback program 110a in client computer 102 and the feedback program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
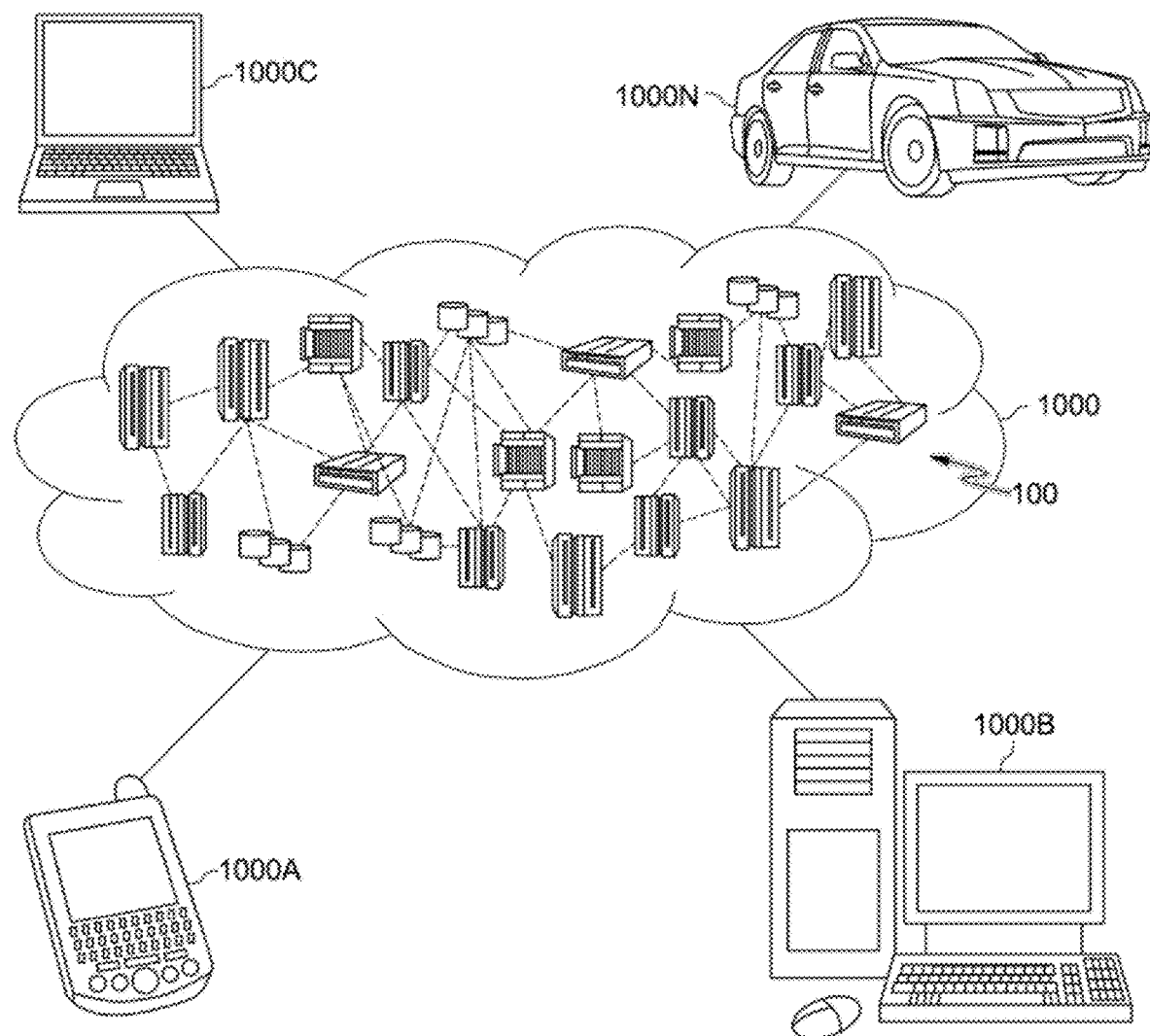
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 (e.g., networked computer environment 100) with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
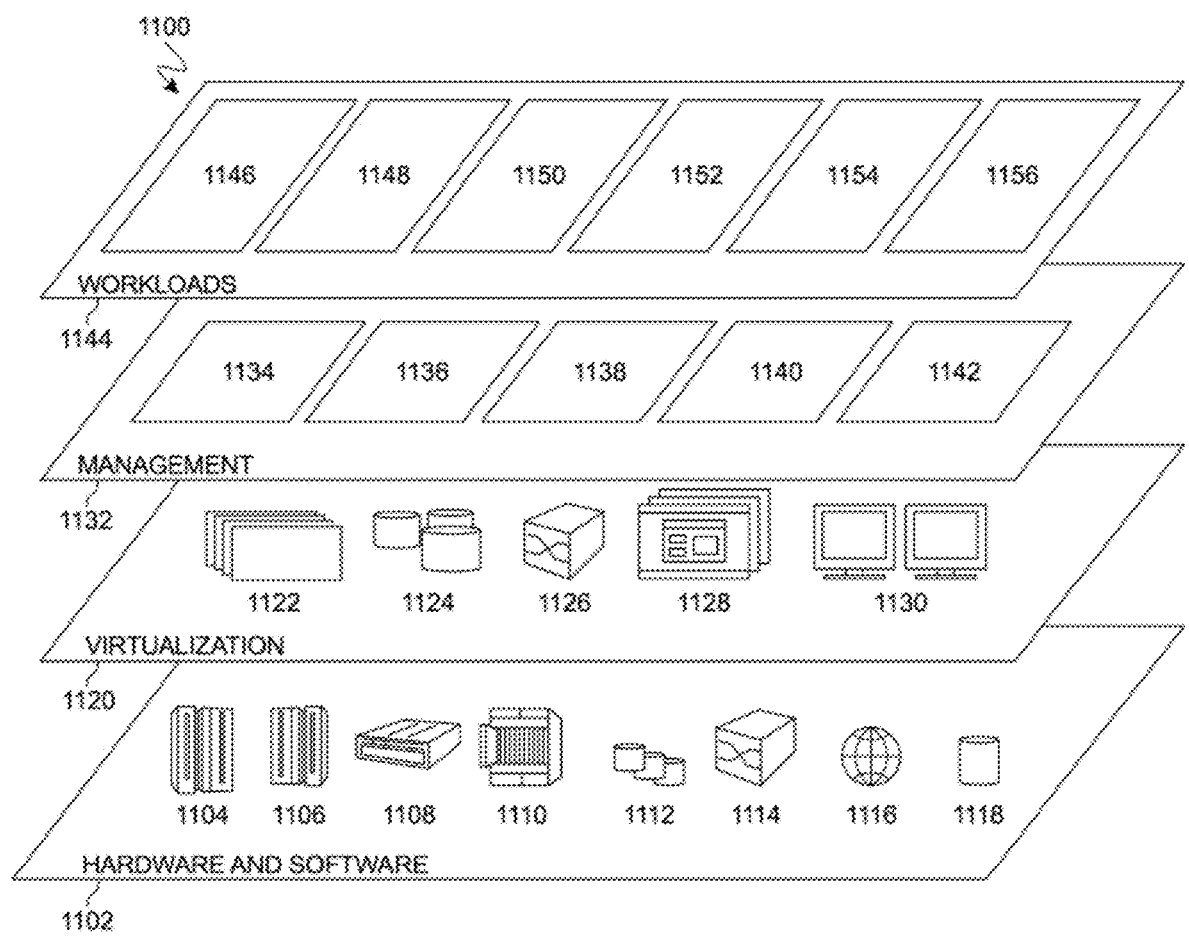
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and feedback analysis 1156. A feedback program 110a, 110b provides a way to gather a user feedback at a point in time and analyze the user feedback within each temporal class to understand user perceptions of previous, current, and future versions of a product or service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method comprising:
identifying, using a natural language processing (NLP) component, a verb-related tag in a feedback data based on parts-of-speech tagging of the feedback data, wherein the feedback data is associated with a current version of a tool;
classifying the feedback data into a temporal class based on a verb tense indicated by the identified verb-related tag, wherein classifying the feedback data into the temporal class includes:

in response to identifying a present tense verb in the feedback data, classifying the feedback data to a current temporal class, wherein the current temporal class is associated with the current version of the tool;

in response to identifying a past tense verb in the feedback data, classifying the feedback data to a prior temporal class, wherein the prior temporal class is associated with a prior version of the tool;

in response to identifying a future tense verb in the feedback data, classifying the feedback data to a future temporal class, wherein the future temporal class is associated with a future version of the tool;

analyzing, using the NLP component, the classified feedback data within the temporal class; and determining, based on the analyzed feedback data, a user perception associated with the current version of the tool relative to the temporal class of the analyzed feedback data.

2. The method of claim 1, further comprising:
retrieving, from a user feedback source, the analyzed feedback data associated with the current version of the tool.

3. The method of claim 1, further comprising:
in response to analyzing the feedback data classified to the prior temporal class, determining the user perception associated with the current version of the tool relative to the prior version of the tool.

4. The method of claim 1, further comprising:
in response to analyzing the feedback data classified to the future temporal class, determining the user perception associated with the current version of the tool relative to the future version of the tool.

5. The method of claim 4, further comprising:
identifying, based on the determined user perception associated with the current version of the tool relative to the future version of the tool, a future enhancement for including in the future version of the tool.

6. A computer system for feedback analysis, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

identifying, using a natural language processing (NLP) component, a verb-related tag in a feedback data based on parts-of-speech tagging of the feedback data, wherein the feedback data is associated with a current version of a tool;

classifying the feedback data into a temporal class based on a verb tense indicated by the identified verb-related tag, wherein classifying the feedback data into the temporal class includes:

in response to identifying a present tense verb in the feedback data, classifying the feedback data to a current temporal class, wherein the current temporal class is associated with the current version of the tool;

in response to identifying a past tense verb in the feedback data, classifying the feedback data to a prior temporal class, wherein the prior temporal class is associated with a prior version of the tool;

in response to identifying a future tense verb in the feedback data, classifying the feedback data to a future temporal class, wherein the future temporal class is associated with a future version of the tool;

analyzing, using the NLP component, the classified feedback data within the temporal class; and determining, based on the analyzed feedback data, a user perception associated with the current version of the tool relative to the temporal class of the analyzed feedback data.

7. The computer system of claim 6, further comprising:
retrieving, from a user feedback source, the feedback data associated with the current version of the tool.

8. The computer system of claim 6, further comprising:
in response to analyzing the feedback data classified to the prior temporal class, determining the user perception associated with the current version of the tool relative to the prior version of the tool.

9. The computer system of claim 6, further comprising:
in response to analyzing the feedback data classified to the future temporal class, determining the user perception associated with the current version of the tool relative to the future version of the tool.

10. The computer system of claim 9, further comprising:
identifying, based on the determined user perception associated with the current version of the tool relative to the future version of the tool, a future enhancement for including in the future version of the tool.

11. A computer program product for feedback analysis, the computer program product comprising a computer readable storage medium having program instructions embodied therewith, the program instructions executable by a processor to cause the processor to perform a method comprising:

identifying, using a natural language processing (NLP) component, a verb-related tag in a feedback data based on parts-of-speech tagging of the feedback data, wherein the feedback data is associated with a current version of a tool;

classifying the feedback data into a temporal class based on a verb tense indicated by the identified verb-related tag, wherein classifying the feedback data into the temporal class includes:

in response to identifying a present tense verb in the feedback data, classifying the feedback data to a current temporal class, wherein the current temporal class is associated with the current version of the tool;

in response to identifying a past tense verb in the feedback data, classifying the feedback data to a prior temporal class, wherein the prior temporal class is associated with a prior version of the tool;

in response to identifying a future tense verb in the feedback data, classifying the feedback data to a future temporal class, wherein the future temporal class is associated with a future version of the tool;

analyzing, using the NLP component, the classified feedback data within the temporal class; and determining, based on the analyzed feedback data, a user perception associated with the current version of the tool relative to the temporal class of the analyzed feedback data.

12. The computer program product of claim 11, further comprising:
retrieving, from a user feedback source, the feedback data associated with the current version of the tool.

13. The computer program product of claim 11, further comprising:
in response to analyzing the feedback data classified to the prior temporal class, determining the user perception associated with the current version of the tool relative to the prior version of the tool.

14. The computer program product of claim 11, further comprising:
in response to analyzing the feedback data classified to the future temporal class, determining the user perception associated with the current version of the tool relative to the future version of the tool.

* * * * *